United States Patent
Kimura

[15] 3,654,788
[45] Apr. 11, 1972

[54] METHOD OF DISCHARGE FORMING BULGED ARTICLES

[72] Inventor: Tadao Kimura, Tokyo, Japan
[73] Assignee: Lead Metal Kogyo Kabushiki Kaisha, Tokyo, Japan
[22] Filed: Nov. 17, 1969
[21] Appl. No.: 877,393

[30] Foreign Application Priority Data

Nov. 20, 1968 Japan..................................43/85365

[52] U.S. Cl..................................................72/56, 29/421
[51] Int. Cl.........................................................B21d 26/12
[58] Field of Search..................72/56, 61, 62, 58, 59; 29/421

[56] References Cited

UNITED STATES PATENTS

| | | | |
|---|---|---|---|
| 3,535,901 | 10/1970 | Tominaga | 72/61 |
| 3,267,710 | 8/1966 | Inoue | 72/56 |
| 349,718 | 9/1886 | Hollerith et al. | 72/59 |
| 1,946,472 | 2/1934 | Babcock | 72/59 |

FOREIGN PATENTS OR APPLICATIONS

| | | | |
|---|---|---|---|
| 1,234,706 | 5/1960 | France | 72/59 |
| 175,399 | 2/1922 | Great Britain | 72/59 |
| 1,056,343 | 1/1967 | Great Britain | 72/56 |

*Primary Examiner*—Richard J. Herbst
*Attorney*—Stevens, Davis, Miller & Mosher

[57] ABSTRACT

A method of discharge forming bulged articles comprising the steps of inserting a hollow tube-like metallic workpiece in an axially movable mold member, releasing an energy by high voltage discharge so that said movable mold member may be caused to move axially thereof toward a fixed mold member, and compressing said hollow tube-like workpiece axially thereof to cause a portion of the wall of the workpiece to expand outwardly whereby a tube-like article with a bulge can be produced.

3 Claims, 5 Drawing Figures

PATENTED APR 11 1972 3,654,788
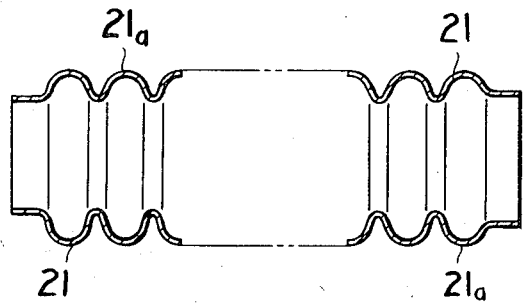
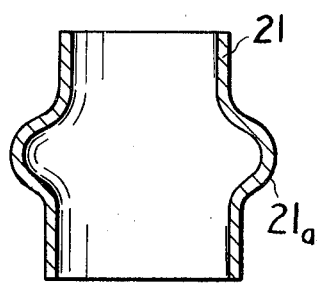
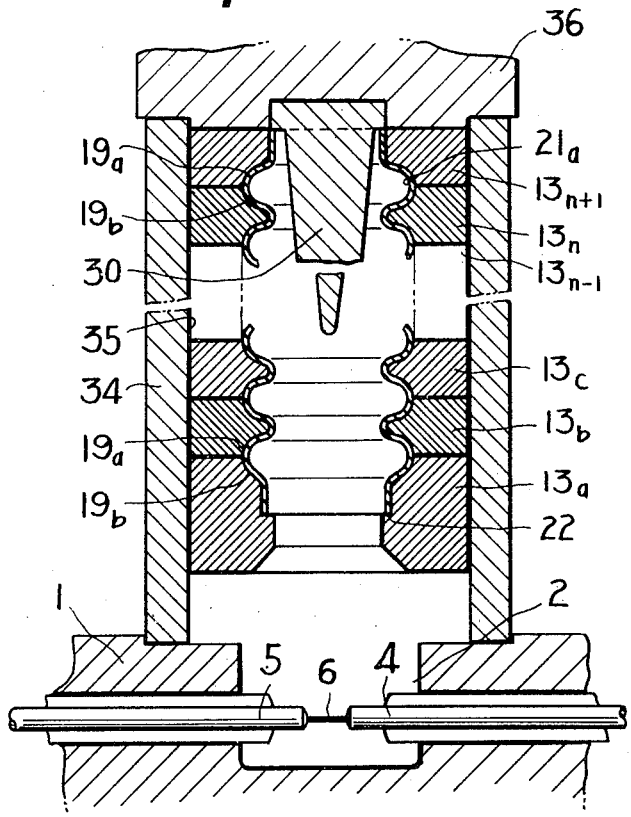
T. KIMURA
INVENTOR
BY Stevens, Davis, Miller &
Mosher ATTORNEYS

PATENTED APR 11 1972

METHOD OF DISCHARGE FORMING BULGED ARTICLES

This invention relates to methods of discharge forming bulged articles. More particularly, the invention is concerned with a method of forming a bulge or bulges in a hollow tube-like metallic workpiece by causing a portion or portions of its side wall to expand outwardly in uniform thickness by the impact energy released by high voltage discharge. The invention has particular utility in producing heat dissipation members of thermal exchangers.

Production of bulged tube-like articles by discharge forming has hitherto been difficult to perform mechanically on a mass production basis. It has therefore been customary to produce such articles by manual operation. The present invention has made it possible to produce such articles by discharge forming on a mass production basis.

Accordingly, a principal object of this invention is to provide a method of discharge forming which permits to perform forming of a bulge in a hollow tube-like metallic workpiece by causing a portion of its side wall to expand outwardly in uniform thickness by the impact energy released by high voltage discharge in one operation so as to produce bulged articles of precision finish at a high yield.

Another object of the invention is to provide a method of discharge forming which permits to perform precision forming, to attain a high work rate with a material of low percentage of elongation of materials, so that it is possible to work on workpieces of materials of relatively low percentage of elongation, and to attain a high work rate in working on workpieces of materials which tend to suffer a high degree of work hardening during processing without effecting annealing.

Still another object of the invention is to provide a method of discharge forming in which a hollow tube-like metallic workpiece is secured at one end to a movable mold member adapted to be moved in sliding motion by the impact energy released by high voltage discharge and at the other end to a fixed mold member, said movable mold member being permitted to move toward said fixed mold member when high voltage discharge takes place so that the hollow tube-like metallic workpiece can be compressed axially thereof to cause a portion of the wall of the workpiece to be deformed to expand and conform to the configuration of the inner wall surface of the mold so as to produce a tube-like article with a bulge of uniform thickness.

Further object of the invention is to provide a method of discharge forming which permits to simultaneously work on a plurality of hollow tube-like metallic workpieces for simultaneously forming a bulge on the side wall of each workpiece by providing a plurality of movable mold members arranged in relation to a discharge chamber.

Still further object of the invention is to provide a method of discharge forming which permits to simultaneously form a plurality of bulges on portions of the side wall of a hollow tube-like metallic workpiece by arranging a plurality of movable mold members in end to end relationship.

Yet further object of the invention is to provide a method of discharge forming in which a fixed mold member is provided with a guide having a conical portion adapted to be inserted into a movable mold member so that the impact energy released by high voltage discharge can be transmitted by said guide in a direction normal to the longitudinal axis of the workpiece to thereby ensure that bulge of desired form and dimension is formed.

Other objects as well as features and advantages of the invention will become evident from consideration of the description set forth hereinafter when considered in conjunction with the accompanying drawings, in which:

FIG. 1 is a longitudinal sectional view of one example of the article produced by the method according to this invention;

FIG. 4 is a longitudinal sectional view of the other example of the article produced by the method according to this invention; and FIG. 5 is a longitudinal sectional view of the other example of the forming apparatus adapted for carrying the method according to this invention into practice shown in a position in which a forming operation is completed.

Figure 2:
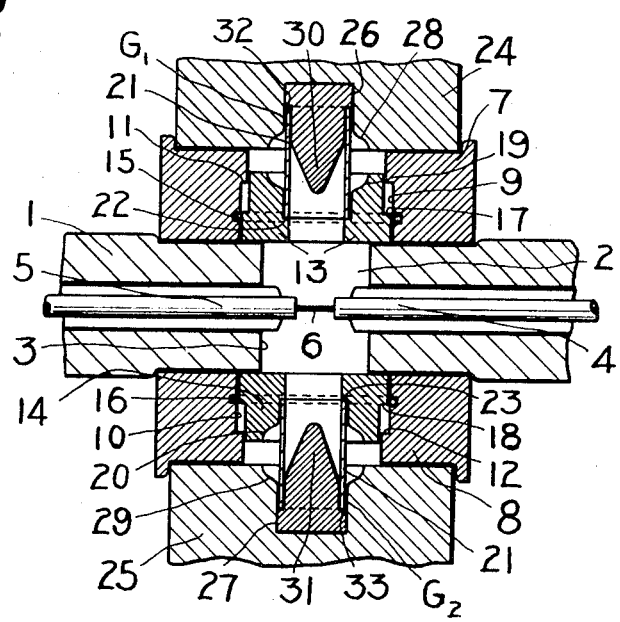
FIG. 2 is a longitudinal sectional view of one example of the forming apparatus adapted for carrying the method according to this invention into practice.
Figure 3:
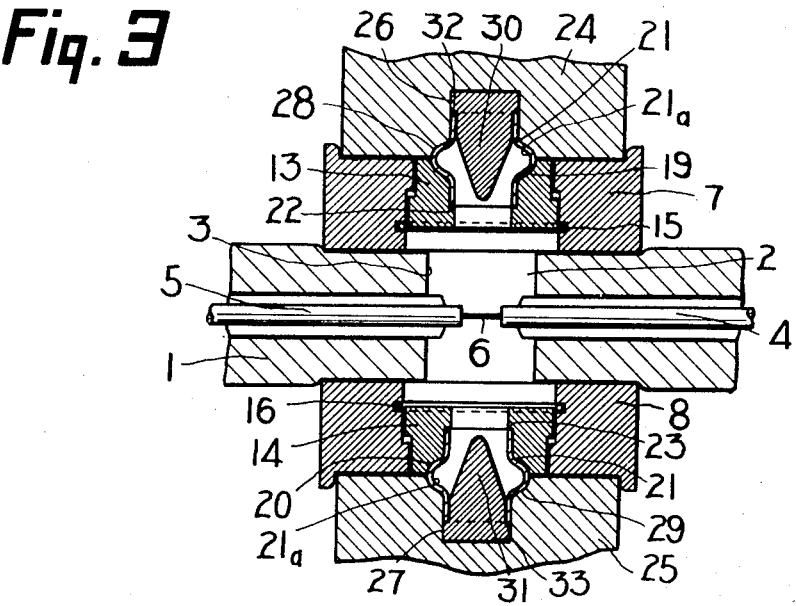
FIG. 3 is a longitudinal sectional view of the apparatus of FIG. 2 shown in a position in which a forming operation is completed.

The method according to this invention will now be explained with reference to one example of the forming apparatus adapted for carrying the method into practice. In the drawings, 1 is a fixed table which is formed in its central portion with a cylindrical bore 3 disposed vertically for defining a discharge chamber 2 therein. Discharge electrodes 4 and 5 are disposed in a horizontal position in the fixed table 1 to project through the wall of the bore 3 in positions diametrically opposed to each other so that the forward end portions of the discharge electrodes 4 and 5 are disposed in juxtaposed relationship and spaced apart from each other a predetermined distance. An electrode member 6 formed of aluminum or other like material is connected at opposite ends to the forward ends of the discharge electrodes 4 and 5 so as to minimize waste of electrodes and increase the discharge capacity of the discharge electrodes.

Disposed on the upper surface and underside of the fixed table 1 are mold guides 7 and 8 respectively which are formed in their central portions with mold guide bores 9 and 10 respectively which are cylindrical in shape and disposed concentric with the bore 3 formed in the fixed table 1 but having a diameter greater than the diameter of the bore 3. Locking offset portions 11 and 12 are formed in the intermediate portions of the inner walls of the guide bores 9 and 10 respectively. Slidably fitted in the mold guide bores 9 and 10 are movable annular mold members 13 and 14 respectively which are maintained at their outer walls in intimate contact with annular rings 15 and 16 respectively provided on the inner walls of the guide bores 9 and 10 so as to provide an airtight seal to the movable mold members.

Formed in the outer walls of the movable mold members 13 and 14 are offset portions 17 and 18 respectively which are adapted to be engaged by said locking offset portions 11 and 12 and held in place thereby to prevent overrunning of the movable mold members 13 and 14. The movable mold members 13 and 14 are formed with concave forming surfaces 19 and 20 respectively at the upper end (lower end in the case of 20) of the inner surfaces of the movable mold members 13 and 14 and offset portions 22 and 23 respectively in the intermediate portions of the inner wall surfaces for engaging an end of a hollow tube-like metallic workpiece 21 to hold the workpiece in place.

Fixed mold members 24 and 25 are removably mounted on the upper and lower sides of the mold guides 7 and 8 respectively. Formed in said fixed mold members 24 and 25 on the sides in contact with the mold guides and aligned with the cavities of the movable mold members 13 and 14 are holes 26 and 27 which are formed on their edges with concave forming surfaces 28 and 29 which are complementary with the concave forming surfaces 19 and 20 of the movable mold members 13 and 14 respectively.

Guides 30 and 31 are fixed to the bottoms of the holes 26 and 27 formed in the fixed mold members 24 and 25 respectively and have forward end portions which are adapted to extend into the guide bores 9 and 10 of the movable mold guides 7 and 8. Said forward end portions of the guides 30 and 31 are conical in shape and locking offset portions 32 and 33 of increased diameter are formed at the bases of the guides 30 and 31 respectively. Spaces $G_1$ and $G_2$ for receiving the workpieces 21 and 21 therein are formed between the inner wall surfaces of the holes 26 and 27 of the fixed mold members 24 and 25 and the outer surfaces of the guides 30 and 31.

In operation, the movable mold members 13 and 14 are moved to a position in which they are in contact with the peripheral edges of the opposite ends of the bore 3 in the fixed table 1, and the tube-like workpieces 21 and 21 are inserted in the movable mold members 13 and 14 respectively so as to be held in place in the movable mold members with the end thereof resting on locking offset portions 22 and 23 respectively. Then, the fixed mold members 24 and 25 are placed on the outer surfaces of the guides 7 and 8 respectively and fixed in place by suitable means in such a manner that the tube-like workpieces 21 and 21 are received in the spaces $G_1$ and $G_2$ disposed between the inner wall surfaces of the holes 26 and 27 and the outer surfaces of the guides 30 and 31 and engage at the other end the locking offset portions 32 and 33 of the guides 30 and 31 respectively.

Then, a high voltage is applied between the two electrodes 4 and 5. The movable mold members 13 and 14 having their open ends disposed adjacent the discharge chamber 2 are caused, by the energy released by high voltage discharge, to move rapidly in sliding motion along the inner wall surfaces of the guide bores 9 and 10 of the mold guides 7 and 8 toward the fixed mold members 24 and 25 respectively. Since the tube-like workpieces 21 and 21 are locked at one end by the offset portions 22 and 23 of the movable mold members 13 and 14 and at the other end by the locking offset portions 32 and 33 of the guides 30 and 31 respectively, the side walls of the workpieces 21 and 21 are caused to expand outwardly so that bulges $21_a$ and $21_a$ thus formed conform to the configuration of the forming surfaces 19, 20 and 28, 29 of the two mold members 13, 14 and 24, 25. Thus, it is possible to produce bulged articles as shown in FIG. 1.

Optimum conditions for the operation of this example will be explained. In working on tube-like metallic workpieces 21 of 40 millimeters in outer diameter and 2.6 millimeters in thickness to produce articles each having a bulged portion $21_a$ of 55 millimeters in outer diameter, the discharge electrodes 4 and 5 are spaced apart from each other at their forward ends a distance of 25 millimeters. The electrode member 6 connecting these two discharge electrodes has a diameter of 0.4 millimeter.

The bore 3 formed in the fixed table 1 and serving as the discharge chamber 2 has an inner diameter of 70 millimeters and the movable mold members 13 and 14 have an inner diameter of 34 millimeters. A charge voltage of 23 KV and a capacitor of a capacity of 74 $\mu F$ are used to release an electric energy of 19.8 KJ.

The method according to this invention will be explained with reference to the other example of the forming apparatus shown in FIG. 4 for forming a plurality of bulges spaced apart equidistantly from one another on a tube-like workpiece. As shown in FIG. 5 in which parts similar to the parts shown in preceding figures are designated by like reference characters, a mold guide 34 formed with an axial guide bore 35 therein is supported at one end by the fixed table 1 formed with the discharge chamber 2 therein. Annular movable mold members $13_a$, $13_b$, $13_c$, ... $13_n$ corresponding in number to the bulges $21_a$ to be formed are successively mounted in the guide bore 35 for sliding motion along the wall of the guide bore 35 while an airtight seal is provided thereto. Another mold member $13_{n+1}$ is mounted over the mold member $13_n$ adjacent the other end of the guide 34. A fixed member 36 is mounted on the other end of the mold guide 34 so as to be maintained in contact with the mold member $13_{n+1}$. The movable mold members $13_b$, $13_c$ ... $13_{n-1}$ and $13_n$ except for the mold members disposed in contact with opposite ends of the mold guide 34 are formed on opposite ends in the inner wall surfaces with concave forming surfaces $19_a$ and $19_b$ which are symmetrical and complementary with each other. The mold members $13_a$ and $13_{n+1}$ disposed in opposite ends of the mold guide 34 are formed at one end in the inner wall surfaces with concave forming surfaces $19_b$ and $19_a$ which are symmetrical and complementary with the forming surfaces $19_a$ and $19_b$ of the adjacent mold members $13_b$ and $13_n$ respectively. The movable mold member $13_a$ disposed on the end of the mold support 34 adjacent the discharge chamber 2 is formed in its inner wall surface with the locking offset portion 22 for holding the tube-like workpiece 21 in place. The fixed mold member 36 is formed on its inner surface with the guide 30 which is adapted to extend into the cavities of the aforementioned movable mold members.

In operation, the tube-like workpiece 21 is inserted, through the open end of the guide bore 35 disposed opposite to the end which is adjacent the discharge chamber 2, into the movable mold members disposed in the guide bore 35 of the mold guide 34 so that the workpiece is held in place at one end thereof by the locking offset portion 22 of the movable mold member $13_a$ and maintained in engagement with the straight portion of the inner wall of the mold $13_a$. Then, the fixed member 36 is mounted on the open end of the guide bore 35 so that the guide 30 extends into the cavity formed by the mold members and the other end of the workpiece is held in place by the fixed member 36. Then, a high voltage is applied between the two electrodes 4 and 5 in the same manner as described with the previous example. The movable mold members $13_a$, $13_b$ . . . disposed adjacent the discharge chamber 2 are caused, by the impact energy released by high voltage discharge, to move rapidly in sliding motion along the inner wall of the guide bore 35 of the mold guide 34 toward the fixed member 36. Since the tube-like workpiece 21 is held in place at one end by the offset portion 22 and at the other end by the fixed member 36, the side wall of the workpiece 21 is caused to expand outwardly to conform to the configuration of the forming surfaces $19_a$ and $19_b$ of the movable mold members $13_a$, $13_b$ ... $13_n$ and $13_{n+1}$. Thus, the tube-like workpiece 21 is formed with bulges $21_a$ which conform to the configuration of the annular portions formed by the shaping surfaces $19_a$ and $19_b$ to provide a bulged article as shown in FIG. 4.

Optimum conditions for the operation of this example will be explained. In tube-like metallic workpieces 21 of 40 millimeters in outer diameter and 0.8 millimeter in thickness to produce articles of 216 millimeters long each having a plurality of bulged portions $21_a$ of 49 millimeters in outer diameter, the discharge electrodes 4 and 5 are spaced apart from each other at their forward ends a distance of 25 millimeters. The discharge chamber 2 has an inner diameter of 70 millimeters and the movable mold members each have an inner diameter of 36 millimeters. A charge voltage of 28 KV and a capacitor of a capacity of 100 $\mu F$ are used to release an electric energy of 39.2 KJ.

From the foregoing description, it will be appreciated that the method according to this invention permits to form at least one bulge of uniform thickness in a tube-like workpiece by compressing the workpiece axially thereof by the impact energy released by high voltage discharge while securing the workpiece to the movable mold member at one end and firmly securing it to an immovable member at the other end.

I claim:

1. A method of discharge forming bulged articles comprising the steps of inserting a hollow tube-like metallic workpiece in an axially movable mold member to secure one end of the workpiece to the inner wall surface of the movable mold while maintaining the workpiece at the other end in locked engagement with a fixed mold member, having a guide attached thereto, said guide being adapted to extend into the tube-like workpiece and having a forward end portion of conical shape, effecting a high voltage discharge, directing by said guide impact energy released by said discharge against a portion of the side wall of the workpiece and against said movable mold member to move said member axially thereof toward said fixed mold member, whereby said hollow tube-like workpiece is compressed axially thereof and the wall of the workpiece is expanded outwardly to conform to the configuration of the forming surfaces of said mold members.

2. A method of discharge forming as set forth in claim 1 wherein the impact energy of the high voltage discharge is applied simultaneously to a plurality of workpieces in like axially movable and fixed mold member assemblies so as to simultaneously conform each of said workpieces to its respective mold configuration.

3. A method of discharge forming as set forth in claim 1 wherein the workpiece is inserted in a movable mold member having a plurality of forming sections whereby a plurality of bulges of uniform thickness are formed in said workpiece.

* * * * *